2 Sheets—Sheet 1.

F. E. JOSEL.
Corn-Planter.

No. 205,487. Patented July 2, 1878.

WITNESSES:
Chas. C. Gill
D. P. Lowe

INVENTOR:
Francis E. Josel
By his Attys
Cox and Cox

2 Sheets—Sheet 2.

F. E. JOSEL.
Corn-Planter.

No. 205,487. Patented July 2, 1878.

WITNESSES:
Chas. C. Gill
D. P. Lowe

INVENTOR:
Francis E. Josel
By his Atty
Cox and Cox

UNITED STATES PATENT OFFICE.

FRANCIS E. JOSEL, OF FREEPORT, ILLINOIS, ASSIGNOR OF ONE-HALF HIS RIGHT TO HIRAM BRIGHT, OF SAME PLACE.

IMPROVEMENT IN CORN-PLANTERS.

Specification forming part of Letters Patent No. 205,487, dated July 2, 1878; application filed March 11, 1878.

*To all whom it may concern:*

Be it known that I, FRANCIS E. JOSEL, of Freeport, in the county of Stephenson and State of Illinois, have invented a new and useful Improvement in Corn - Planters, of which the following is a specification, reference being had to the accompanying drawings.

The invention relates to an improvement in corn-planters, and consists in the devices hereinafter fully described.

The object of the invention is to furnish a suitable means for dropping and covering corn or seed, as hereinafter more specifically explained.

Figure 1:
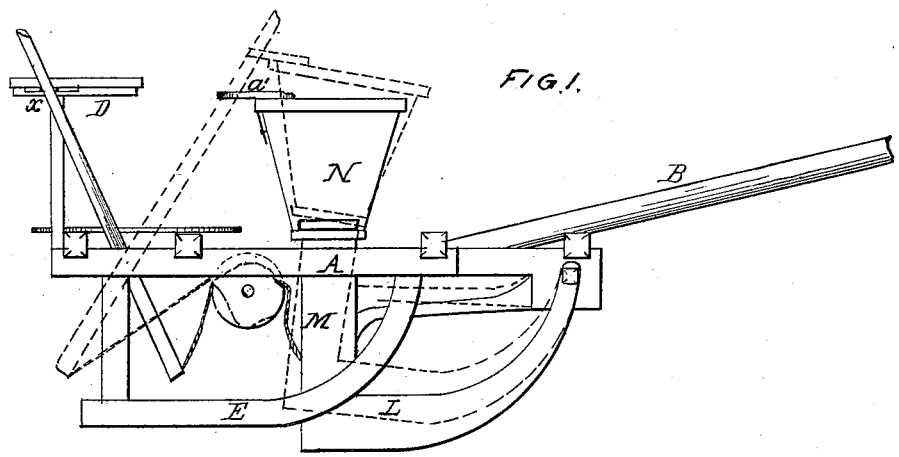
Figure 2:
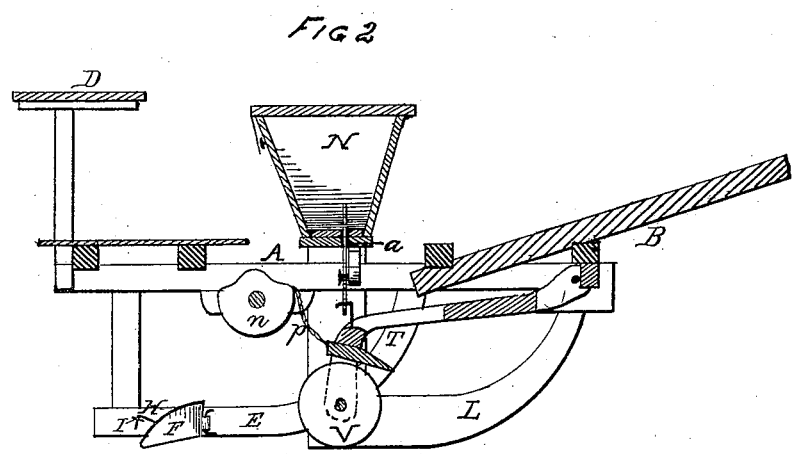
Figure 3:
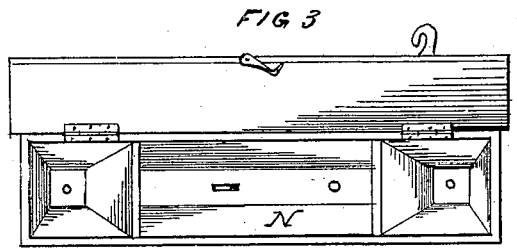
Figure 4:
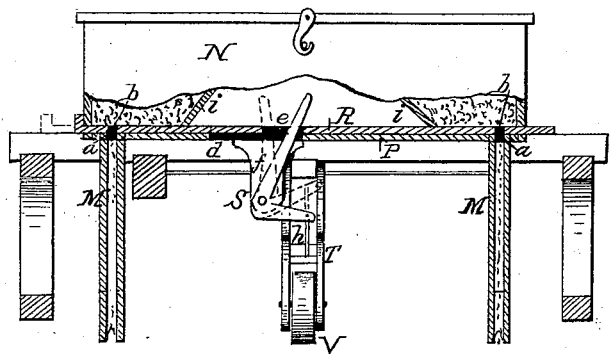
Figure 5:
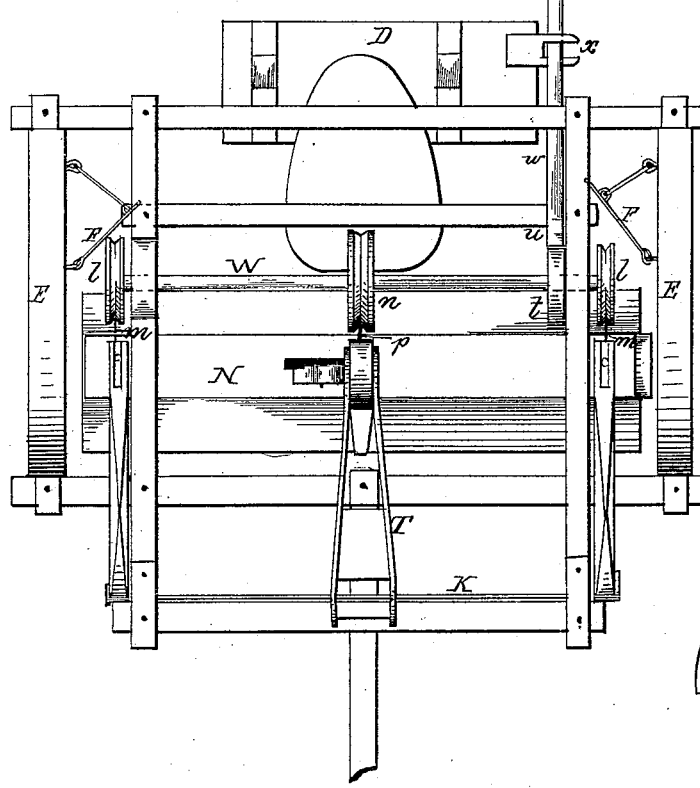
Figure 6:
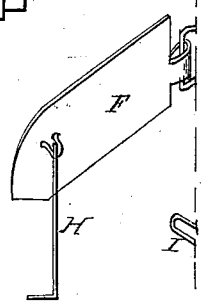

Referring to the accompanying drawings, Figure 1 is a side elevation of a device embodying the elements of the invention. Fig. 2 is a central vertical longitudinal section of same. Fig. 3 is a top view of the seed-trough. Fig. 4 is a central vertical transverse section of the implement. Fig. 5 is a bottom view of same. Fig. 6 is a perspective view of one of the spreaders.

In the accompanying drawings, A represents the frame of the implement, which is supplied on its front portion with the tongue B, and at its rear with the driver's seat D.

Upon the lower surface of each side of the frame A is secured a runner, E, upon which the implement is supported, and each of which is provided, near its rear end and on its inner side, with the hinged coverer F, extending inward and having on its free end the hook H, which, when the device is being used, is designed to engage the eye I, and thereby retain the spreader in a firm position, and at a suitable angle to the side of the runner.

In the forward end of the frame A is mounted the shaft K, having hinged upon its ends the runners L, which extend rearward a proper distance, and have secured upon their rear ends the vertical hollow drills M, which pass upward adjacent to the runners E, and are connected to the seed-trough N, rigidly mounted upon their upper ends, the trough being supplied with apertures $a$ in its bottom P, immediately above the drills M, so that corn or seed falling into the apertures can pass downward through the drills to the ground.

The trough N is provided with the bottom R, which rests and slides upon the bottom P and extends beyond the ends of same. In the bottom R, adjacent to the apertures $a$, are furnished the corresponding apertures $b$, which are designed, when by the movement of the bottom they are over the apertures $a$, to allow the grain to pass through them to the drills.

The bottoms P R are provided near their center with the slots $d\ e$, the slot $d$ being of greater dimensions than the slot $e$, and situated directly beneath it. In these slots is inserted one arm of the bell-crank lever S, mounted on the hanger $f$, the other arm being connected with the rear end of the hanger T by the draw-rod $h$, hereinafter mentioned. The slot $e$ closely fits the arm of the lever; the slot $d$ loosely. It is obvious, therefore, that, according as the arm is moved either to the right or left in the slot $d$, the sliding bottom R will receive a similar motion, either bringing the apertures $a\ b$ opposite each other above the drills, or separating them.

Upon each side of the slot $e$ the trough N is supplied with the partitions $i$, which incline toward the apertures $b$, and thus, while preventing the seed getting into the slot $e$ and impairing the movement of the bell-crank lever, keep the grain over the said apertures, and thereby facilitates the operation of the implement. The seed-trough has a suitable hinged cover, to prevent the escape of seed therefrom.

Midway between the front ends of the frame A, and upon the shaft K, is mounted the hanger T, which extends rearward a distance about equal that of the runners L, and is furnished at its extremity with the wheel V, above which the hanger is connected with the bell-crank lever S by the draw-rod $h$. Thus it is evident that when the hanger T is drawn upward the rod $h$ will correspondingly elevate the lower arm of the lever S, and will accordingly move the other arm of same either to the right or left, with the result before described.

The shaft W is mounted in the frame A just in rear of the drills, and has upon its ends the grooved cams $l$, having one end of the ropes or chains $m$ connected to their upper ends, the other end of the ropes being secured to the rear edge of the drills M. Thus, it is manifest that when the shaft is revolved toward the rear of the frame A, the ropes $m$ will be wound upon the cams $l$, and will draw the drills M upward. Upon the central parts of the shaft W is mounted the cam $n$, which also has a rope, $p$, attached to its upper portion, the lower end of the rope being fastened to the hanger T, in juxtaposition to the draw-rod $h$, and which cam, when the shaft is turned rearward, winds the rope $p$ upon itself, and draws upward the hanger T simultaneously with the ascent of the drills M.

Upon the shaft W, near one of its ends, is secured a wheel, $t$, to the periphery of which is properly attached one end of the band $u$, the other end extending rearward and being connected to the lower end of the lever $w$, which is pivoted to the frame A, and passes upward to within convenient distance of the driver's seat, whereon is secured a catch, $x$, in which the upper end of the lever may be placed to retain it in a fixed position. Upon the cover of the seed-trough is attached a catch, $a'$, similar to the catch $x$, and designed to receive the lever $w$ when it is desired to retain the drills in an elevated position.

The seed-boxes being filled, the implement is set in motion, and the seed-dropping mechism operated by the alternating elevation and depression of the drills M and hanger T, actuated by the movement of the lever $w$ by the driver, when the grain will fall into the furrows made by the runners L, and be covered by the coverer F.

What I claim as my invention, and desire to secure by Letters Patent, is—

1. The drills M, in combination with the runners E and coverers F, hinged thereto, substantially as expressed.

2. The shaft W, provided with the cams $l$ and $n$, having, respectively, the ropes $m$ and $p$, in combination with the drills M, hanger T, bell-crank lever S, and seed-trough N, having bottoms P R, substantially as set forth.

3. The lever $w$, connected with the wheel $t$ by a band, $u$, in combination with the shaft W, having cams $l$ and $n$, drills M, hanger T, bell-crank lever S, and seed-trough N, having bottoms P R, substantially as described.

In testimony that I claim the foregoing improvement in corn-planters as above described, I have hereunto set my hand this 22d day of January, 1878.

FRANCIS E. JOSEL.

Witnesses:
HIRAM BRIGHT.
OWEN E. STEARNS.